M. L. JENKINS.
CASING FOR MOTOR GEARING AND STARTER CONNECTIONS.
APPLICATION FILED AUG. 28, 1913.
1,102,338.
Patented July 7, 1914.
3 SHEETS—SHEET 1.
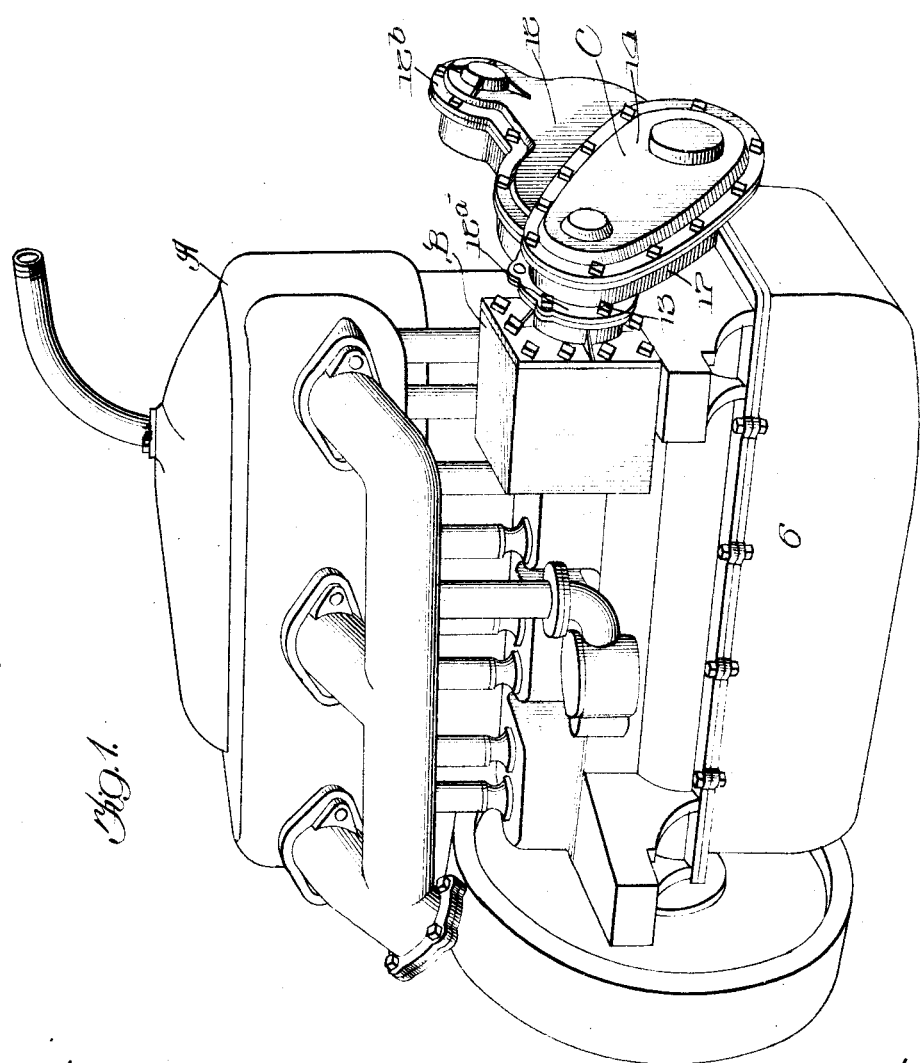

M. L. JENKINS.
CASING FOR MOTOR GEARING AND STARTER CONNECTIONS.
APPLICATION FILED AUG. 28, 1913.
1,102,338.
Patented July 7, 1914.
3 SHEETS—SHEET 2.
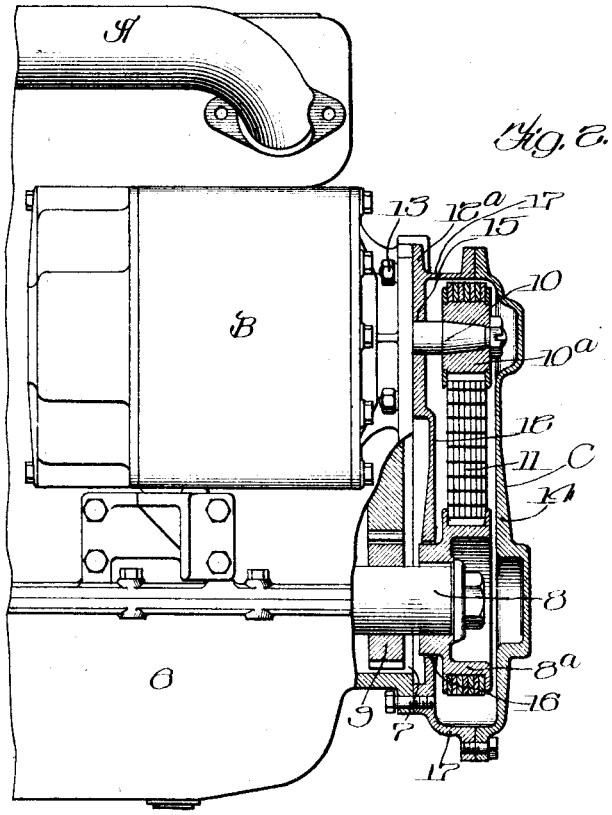
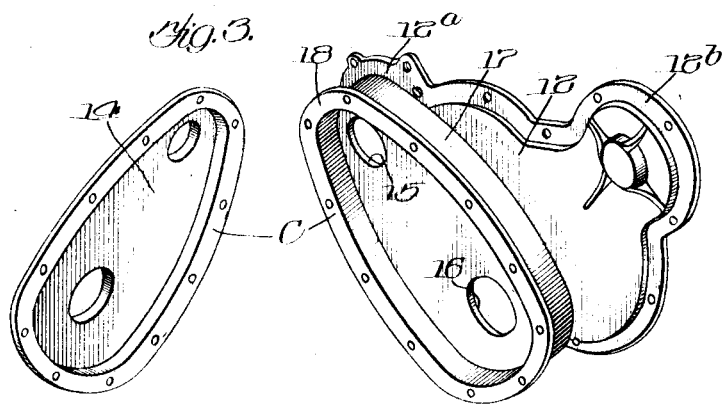

M. L. JENKINS.
CASING FOR MOTOR GEARING AND STARTER CONNECTIONS.
APPLICATION FILED AUG. 28, 1913.
1,102,338.
Patented July 7, 1914.
3 SHEETS—SHEET 3.
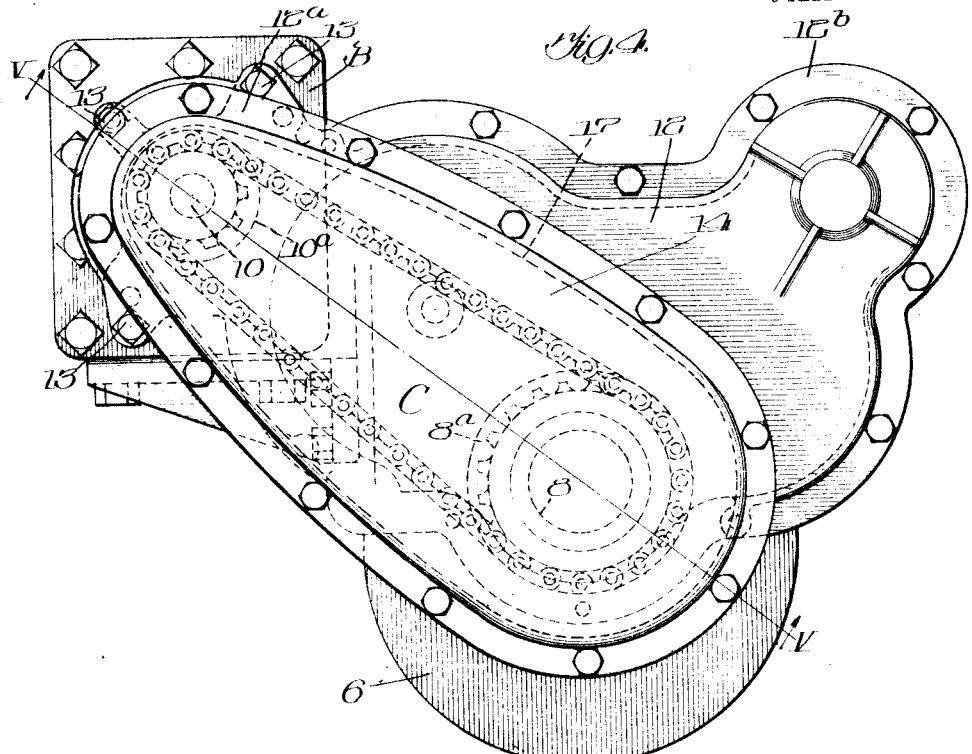
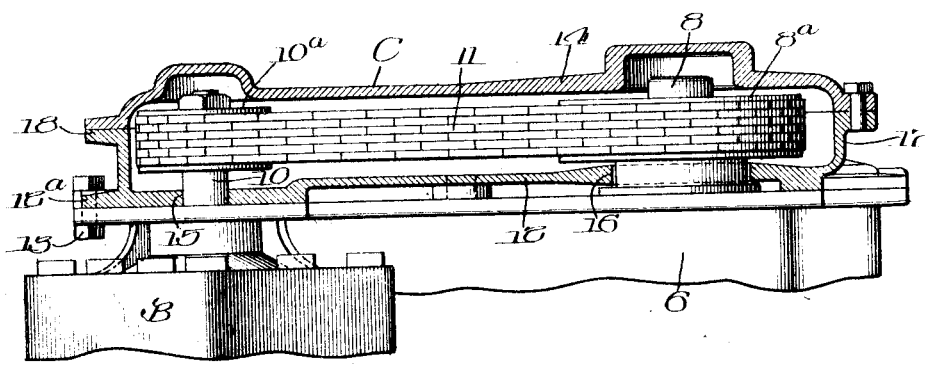

UNITED STATES PATENT OFFICE.

MERRILL L. JENKINS, OF HARVEY, ILLINOIS, ASSIGNOR TO BUDA COMPANY, OF CHICAGO, ILLINOIS, A CORPORATION OF ILLINOIS.

CASING FOR MOTOR GEARING AND STARTER CONNECTIONS.

1,102,338.  Specification of Letters Patent.  Patented July 7, 1914.

Application filed August 28, 1913. Serial No. 787,108.

*To all whom it may concern:*

Be it known that I, MERRILL L. JENKINS, a citizen of the United States, and residing at Harvey, county of Cook, and State of Illinois, have invented certain new and useful Improvements in Casings for Motor Gearing and Starter Connections, of which the following is a specification.

My invention relates generally to improvements in a crank case for an explosion motor, and more particularly to a novel end plate or casing adapted to be attached to and cover the open end of a crank case; and which has for its principal objects the provision of means adapted to inclose timing or valve gearing ordinarily located in close proximity to the open end of a crank case and designed to protect such gearing from damage by contact with or interference from self starter or other connections in operative relation with the main crank shaft; together with means coöperating therewith designed to form a casing for the said connections.

These, together with such other objects as may hereinafter appear, or are incident to my invention, I attain by means of a construction illustrated in preferred form in the accompanying drawings, wherein:

Figure 1 is a view in perspective of the motor crank case, illustrating diagrammatically the application of my invention to the open end thereof.

Figure 2 is a side elevation of one end of the crank case, the parts in which my invention particularly resides being shown in section.

Figure 3 represents a perspective of the dissociated parts shown assembled in Figure 2.

Figure 4 is a front elevation of the said parts, and Figure 5 is a section therethrough on the line V—V of Figure 4.

Broadly stated, the invention contemplates the provision in a motor crank shaft casing having an open end, of an end plate adapted to close said open end, and a cover plate provided to coöperate with the end plate to form a casing for a drive connection between self starting mechanism located adjacent the said open end, and whereby in the drive connection is shut off by the said end plate from mechanism within the crank shaft casing and adjacent the open end.

It is apparent that this arrangement of coöperating end and cover plates can be as effectively employed in housing other connections similarly related to motor mechanism, such as connections to a fan in an air cooled motor. The splash system is largely in use for oiling the mechanism within motor crank cases, and in cases where the connections above referred to are in the form of a belt, it will be obvious that the shutting off of the belt from possible contact with the oil in the crank case is a particularly advantageous feature.

Referring to Figure 1, which illustrates in assembled form the general relation of the parts, A indicates a motor having a crank case 6 which may comprise the upper and lower parts as shown. Suitably mounted within the crank case 6 to extend through the open end 7 thereof is a main crank shaft 8, carrying thereon a gear 9 adapted to be in operative relation with other gears, which together with the gear 9 constitute the timing or valve gearing usually disposed within the crank case 7 and in close proximity to the said open end 7, as shown in Figure 2.

B indicates a conventional form of self starter adjacent the open end 7, which is shown provided with a shaft 10. On the ends of the starter shaft 10 and crank shaft 8 are mounted respectively sprockets 10ª and 8ª having driving connections therebetween consisting of a link belt or chain 11. One of the purposes of this invention is to provide a guard means interposed between the timing gears 9 and the starter connections 11 for the protection of the former from belt interferences, which frequently result in their stoppage or damage, and with this in view I show the crank case 6 provided with the attachment designated as a whole by C, which covers in the open end of the crank case and which also serves to box in the starter connections.

In the practice of my invention, the attachment C preferably comprises two parts, the inner gear case or end plate 12 and the cover plate 14. The former is provided with a peripheral flange 12^b by which it is adapted to be secured to the crank case to inclose the open end thereof and the timing gears located contiguous thereto.

An effective means of mounting the starter B is provided in an offset portion 12^a of the gear case 12 to which the starter is rigidly attached by means of bolts 13. The starter shaft 10 may be provided with a bearing at 15 in the web of the case and extends outwardly therethrough to receive its sprocket 10^a. When the case 12 is attached to the crank case, the outwardly projecting end of the shaft 8 also extends through an enlarged opening 16 formed in the web of the case, to receive thereon its sprocket 8^a whose hub is loosely received in the said opening 16.

Formed on the outer face and about the major portion of the case 12 is an out-turned flange 17 entirely surrounding the starter belt connections to the main shaft, and coöperating with the cover plate 14 to completely house the said connections, the cover plate being removably secured by bolts to a marginal flange 18 offset from the flange 17.

From the description thus far made and positioned as shown, it will be apparent that the parts are easily assembled and that the inner plate or case 12 not only provides a bearing for the starter shaft, but also constitutes a guard means between the gearing and starter connections. Another advantage resides in the fact that the case acts as a rigid support for the starter, and is very effective in obtaining a compact arrangement of the latter with respect to the motor itself. Ready access may be had to timing gears and starter connections to the shaft, as the case and cover plate are easily detachable endwise from the crank shaft case, as will be clearly understood from an inspection of the drawings.

It is obvious that structural variations in point of detail may be made, without departing from the scope of my invention as pointed out in the appended claims. The essential features and elements of the device, together with its simplicity and other advantages thereof, will be clearly apparent to those skilled in the art.

Having thus described my invention and illustrated its use, what I claim as new and desire to secure by Letters Patent is the following:—

1. In an explosion motor, the combination with a main crank shaft, a crank shaft casing having an open end, and a starter adjacent said open end, of a driving connection between the crank shaft and self starter, an end plate for closing the open end of the crank shaft casing and through which the shaft of the starter extends, and a cover plate coöperating with said end plate to form a casing for the said driving connection.

2. In combination with a motor crank case having gearing disposed in proximity to an open end thereof, of a casing or plate adapted to inclose said open end and gearing, a crank shaft in said crank case, means adjacent said open end for starting said crank shaft including as a member thereof a shaft, the ends of both shafts being adapted to extend outwardly through the web of the plate, and connections between the ends of the said shafts.

3. In combination with a motor crank case having an open end and gearing disposed in proximity thereto, of an end plate detachably mounted on said crank case and adapted to inclose the open end and gearing, a main crank shaft, starting mechanism mounted on the end plate adjacent the said open end and provided with connections to the crank shaft, the end plate being positioned between the gearing and the said connections, and means coöperating with the end plate to form a casing for the said connections.

4. In an explosion motor, the combination with a main crank shaft, a crank shaft casing having an open end, and a starter adjacent said open end, of a driving connection between the crank shaft and the shaft of the starter, an end plate for closing said open end and adapted to afford a bearing for the starter shaft, a cover plate, means for fastening the plates together, said plates coöperating to form a casing for the said driving connections.

5. In an explosion motor, the combination with a main crank shaft, a crank shaft casing having an open end, and a starter adjacent said open end, of a driving connection between the crank shaft and the shaft of the starter, a supporting means for the starter consisting of an end plate closing the open end and through which the shafts extend, and means coöperating with said end plate to box in said driving connection.

6. In an explosion motor, the combination with a main crank shaft, a crank shaft casing having an open end, and mechanism adjacent said open end and including a shaft, of a connection between the said shafts, and an end plate for closing said open end and through which the shaft of the said mechanism projects, substantially as described.

7. In an explosion motor, the combination with a main crank shaft, a crank shaft casing, and starting mechanism, of an end plate for the casing provided with an offset web portion through which the starter shaft is adapted to extend, a driving connection between the crank shaft and starter shaft, and means coöperating with said end plate and offset portion to box in said driving connection.

8. In combination, a crank casing provided with an offset portion at one end, a main crank shaft projecting through said end, mechanism positioned without the casing having its shaft extended through said offset portion, a connection between the ends of the shafts, and a chambered fitting constructed and arranged to register with the end of the casing and its offset portion to form a housing for the said connection and the ends of the shafts, substantially as described.

In testimony whereof I have hereunto signed my name in the presence of the two subscribed witnesses.

MERRILL L. JENKINS.

Witnesses:
C. M. WALLACE,
L. C. CURL.